United States Patent
Mikoshiba et al.

(10) Patent No.: US 12,553,140 B2
(45) Date of Patent: Feb. 17, 2026

(54) CARBON DIOXIDE ELECTROLYTIC DEVICE

(71) Applicant: KABUSHIKI KAISHA TOSHIBA, Tokyo (JP)

(72) Inventors: Satoshi Mikoshiba, Yamato (JP); Ryota Kitagawa, Setagaya (JP); Akihiko Ono, Kita (JP); Masakazu Yamagiwa, Yokohama (JP); Yusuke Kofuji, Hiratsuka (JP); Yasuhiro Kiyota, Kawasaki (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 747 days.

(21) Appl. No.: 17/901,905

(22) Filed: Sep. 2, 2022

(65) Prior Publication Data

US 2023/0287588 A1   Sep. 14, 2023

(30) Foreign Application Priority Data

Mar. 14, 2022   (JP) .................................. 2022-039143

(51) Int. Cl.
C25B 15/08 (2006.01)
C12M 1/00 (2006.01)
(Continued)

(52) U.S. Cl.
CPC .......... C25B 15/083 (2021.01); C12M 43/00 (2013.01); C25B 1/04 (2013.01); C25B 1/23 (2021.01);
(Continued)

(58) Field of Classification Search
CPC .................................................. C25B 15/083
See application file for complete search history.

(56) References Cited

U.S. PATENT DOCUMENTS

| | | |
|---|---|---|
| 2017/0218404 A1 | 8/2017 | Simpson et al. |
| 2018/0119294 A1 | 5/2018 | Kitagawa et al. |

(Continued)

FOREIGN PATENT DOCUMENTS

| | | |
|---|---|---|
| EP | 3 670 705 A1 | 6/2020 |
| JP | 2003-336965 A | 11/2003 |

(Continued)

OTHER PUBLICATIONS

Japanese Office Action issued Nov. 12, 2024 in Japanese Patent Application No. 2022-039143, 6 pages (with English language translation).

*Primary Examiner* — Jonathan M Hurst
(74) *Attorney, Agent, or Firm* — Oblon, McClelland, Maier & Neustadt, L.L.P.

(57) ABSTRACT

A carbon dioxide electrolytic device in an embodiment includes: an electrochemical reaction cell including: a first accommodation part that accommodates gas or a first electrolytic solution containing $CO_2$; a second accommodation part that accommodates a second electrolytic solution containing $H_2O$; a diaphragm provided between the first and second accommodation parts; a cathode that is in contact with the gas or the first electrolytic solution; and an anode that is in contact with the second electrolytic solution; a first supply part that supplies the gas or the first electrolytic solution to the first accommodation part; a second supply part that supplies the second electrolytic solution to the second accommodation part; and a carbon dioxide separation part that is connected to a discharge portion of a discharge containing $O_2$ and $CO_2$ from the second accommodation part and includes a cryogenic separation device to separate $CO_2$ from a gas component in the discharge.

6 Claims, 7 Drawing Sheets (51) Int. Cl.
  *C25B 1/04*    (2021.01)
  *C25B 1/23*    (2021.01)
  *C25B 3/26*    (2021.01)
  *C25B 9/19*    (2021.01)

(52) U.S. Cl.
  CPC ............... *C25B 3/26* (2021.01); *C25B 9/19* (2021.01); *C25B 15/081* (2021.01)

(56) References Cited

U.S. PATENT DOCUMENTS

| | | | |
|---|---|---|---|
| 2019/0249315 A1* | 8/2019 | Mihalcea | ............... C25B 15/08 |
| 2021/0292925 A1 | 9/2021 | Mikoshiba et al. | |
| 2021/0348286 A1* | 11/2021 | Bulan | ..................... C25B 9/75 |
| 2022/0081290 A1* | 3/2022 | Shrivastava | ............ F01K 27/00 |

FOREIGN PATENT DOCUMENTS

| | | |
|---|---|---|
| JP | 2015-533944 A | 11/2015 |
| JP | 2018-070936 A | 5/2018 |
| JP | 2019-506165 A | 3/2019 |
| JP | 2021-147679 A | 9/2021 |
| WO | WO 2017/136478 A1 | 8/2017 |

\* cited by examiner

CARBON DIOXIDE ELECTROLYTIC DEVICE

CROSS REFERENCE TO RELATED APPLICATION

This application is based upon and claims the benefit of priority from Japanese Patent Application No. 2022-039143, filed on Mar. 14, 2022; the entire contents of which are incorporated herein by reference.

FIELD

Embodiments disclosed herein relate to a carbon dioxide electrolytic device.

BACKGROUND

In recent years, there is a concern over the depletion of fossil fuel resources such as petroleum and coal, and expectations of sustainable renewable energy have been increasing. From the viewpoint of such energy problems, environmental problems, and so on, a power-to-chemical technology that electrochemically reduces carbon dioxide using renewable energy of sunlight or the like to generate a stockable chemical energy source is under development. A carbon dioxide electrolytic device that implements the power-to-chemical technology includes, for example, an anode that oxidizes water ($H_2O$) to produce oxygen ($O_2$), and a cathode that reduces carbon dioxide ($CO_2$) to produce carbon compounds such as carbon monoxide (CO). The anode and the cathode of the carbon dioxide electrolytic device are connected to a power supply derived from renewable energy such as solar power generation, hydroelectric power generation, wind power generation, geothermal power generation, or the like, for example.

The cathode of the carbon dioxide electrolytic device is arranged to be immersed in water in which $CO_2$ is dissolved or to be in contact with $CO_2$ flowing through a flow path, for example. The cathode obtains reduction potential for $CO_2$ from the power supply derived from renewable energy and thereby reduces $CO_2$ to produce carbon compounds such as carbon monoxide (CO), formic acid (HCOOH), methanol ($CH_3OH$), methane ($CH_4$), ethanol ($C_2H_5OH$), ethane ($C_2H_6$), ethylene ($C_2H_4$), and ethylene glycol ($C_2H_6O_2$). The anode is arranged to be in contact with an electrolytic solution containing water ($H_2O$), and oxygen ($O_2$) and hydrogen ions ($H^+$) are produced. Such a carbon dioxide electrolytic device is required to improve the use efficiency of $CO_2$, and further the use efficiency and utility value of a reduction product of $CO_2$.

DETAILED DESCRIPTION

A carbon dioxide electrolytic device in an embodiment includes: an electrochemical reaction cell including: a first accommodation part configured to accommodate gas containing carbon dioxide or a first electrolytic solution containing carbon dioxide; a second accommodation part configured to accommodate a second electrolytic solution containing water; a diaphragm provided between the first accommodation part and the second accommodation part; a cathode arranged to be in contact with the gas or the first electrolytic solution and configured to reduce carbon dioxide to produce a carbon compound; and an anode arranged to be in contact with the second electrolytic solution and configured to oxidize water to produce oxygen; a first supply part that supplies the gas or the first electrolytic solution to the first accommodation part; a second supply part that supplies the second electrolytic solution to the second accommodation part; and a first carbon dioxide separation part that is connected to a discharge portion to discharge a discharge containing oxygen and carbon dioxide from the second accommodation part and includes a cryogenic separation device to separate the carbon dioxide from a gas component in the discharge.

There will be explained a carbon dioxide electrolytic device in an embodiment with reference to the drawings below. Substantially the same components are denoted by the same reference numerals, and a part of explanation thereof may be omitted in some cases in the embodiment described below. The drawings are schematic, and the relation between thicknesses and plane dimensions, ratios between the thicknesses of the parts, and the like may differ from actual ones.

Figure 1:
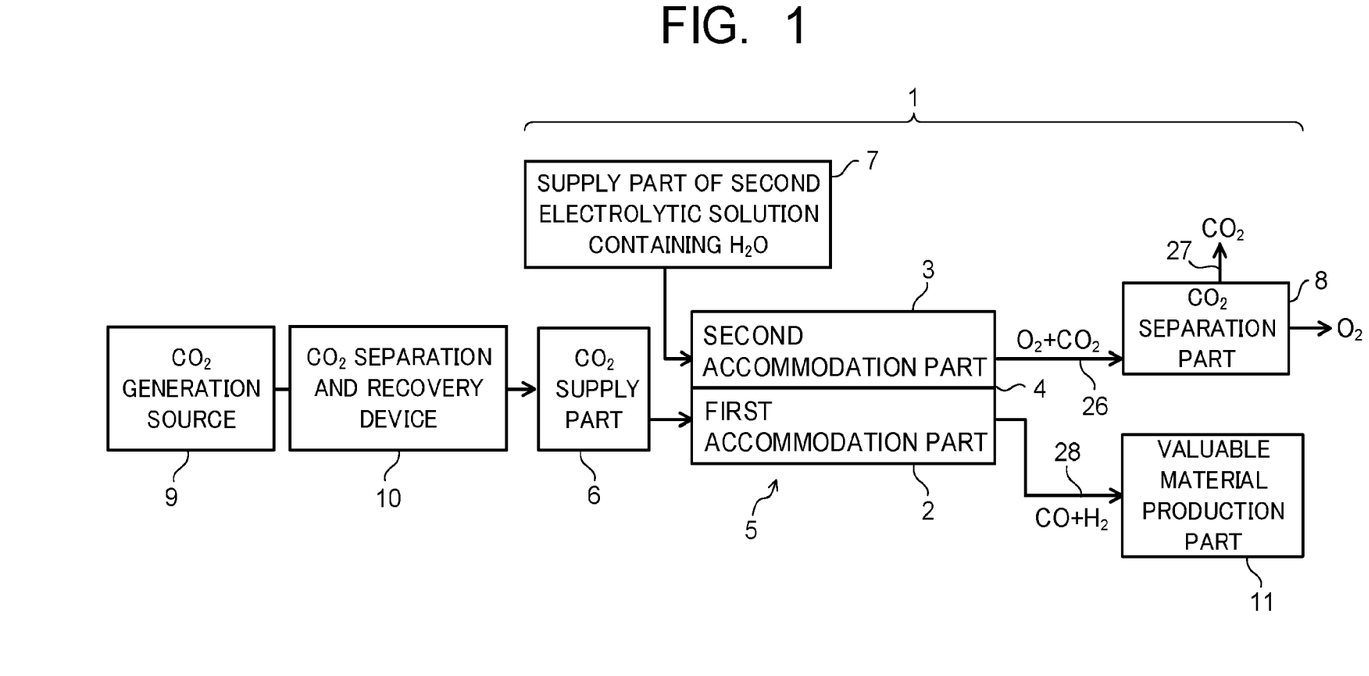
FIG. 1 is a view illustrating a carbon dioxide electrolytic device in an embodiment.

FIG. 1 is a view illustrating a carbon dioxide electrolytic device 1 in an embodiment. The carbon dioxide electrolytic device 1 illustrated in FIG. 1 includes: an electrochemical reaction cell 5 including a first accommodation part 2 configured to accommodate gas containing carbon dioxide ($CO_2$) or a first electrolytic solution containing $CO_2$, a second accommodation part 3 configured to accommodate a second electrolytic solution containing water ($H_2O$), and a diaphragm 4; a first supply part 6 that supplies the gas or the first electrolytic solution to the first accommodation part 2; a second supply part 7 that supplies the second electrolytic solution to the second accommodation part 3; and a carbon dioxide separation part 8 that is connected to a discharge portion to discharge a discharge containing oxygen ($O_2$) and $CO_2$ from the second accommodation part 3 and includes a cryogenic separation device to separate $CO_2$ from a gas component in the discharge. A discharged gas from the second accommodation part 3 will be described in detail later.

A $CO_2$ generation source 9 is connected to the first supply part ($CO_2$ supply part) 6. When a $CO_2$ separation and recovery device 10 is attached to the $CO_2$ generation source 9, the $CO_2$ supply part 6 is connected to the $CO_2$ separation and recovery device 10. The $CO_2$ separation and recovery device 10 may be installed separately from the $CO_2$ generation source 9. Examples of the $CO_2$ generation source 9 include facilities having various incinerators or combustion furnaces such as a thermal power plant and a garbage incinerator, facilities having a steel plant and a blast furnace, and so on. The $CO_2$ generation source 9 may be various factories where $CO_2$ is generated other than these, and so on, and is not limited in particular. To a discharge portion that discharges a discharged gas containing carbon monoxide (CO) and the like from the first accommodation part 2, a valuable material production part 11 is connected. The valuable material production part 11 is a chemical synthesis part that synthesizes a valuable material using, as a raw material, CO and the like discharged from the first accommodation part 2. The valuable material production part 11 is provided according to need, and may be a tank or the like that stores the discharged gas containing CO and the like instead.

Figure 2:
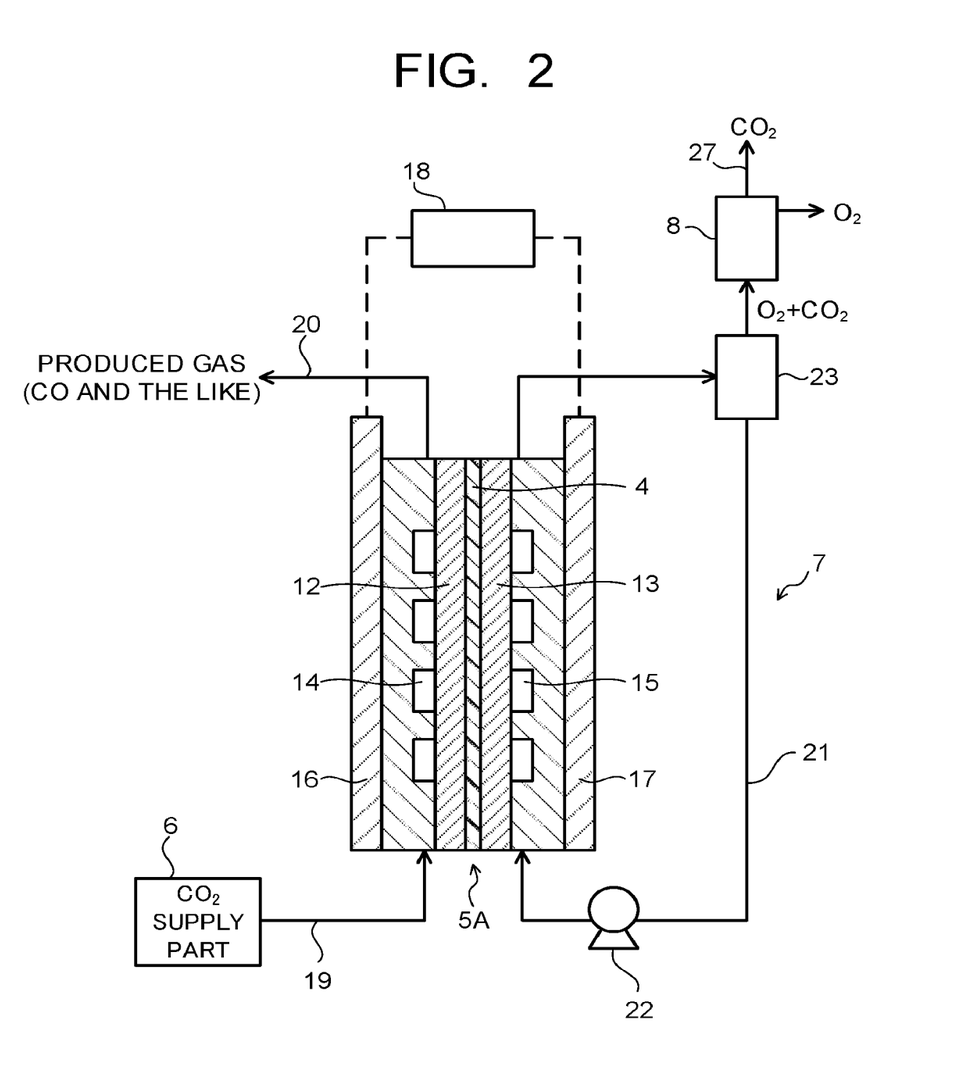
FIG. 2 is a view illustrating a first example of an electrochemical reaction cell in the carbon dioxide electrolytic device illustrated in FIG. 1.
Figure 3:
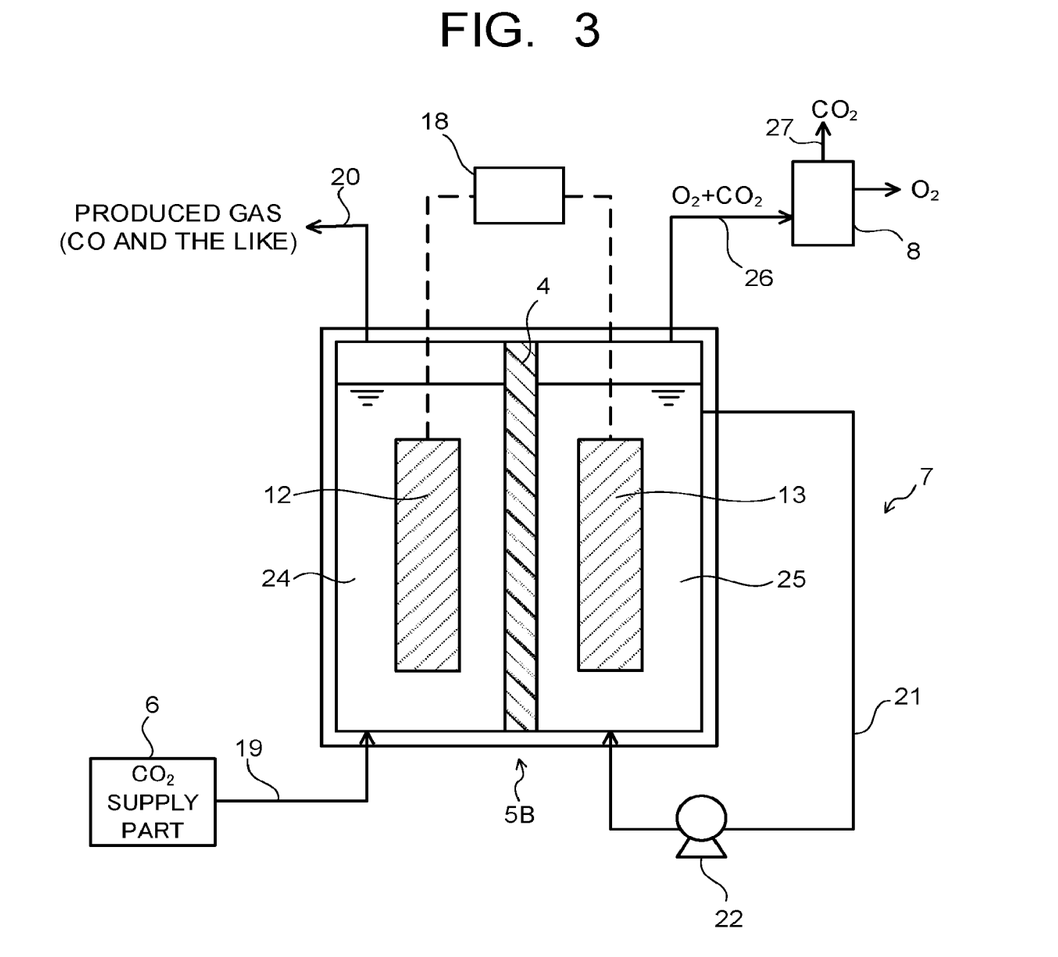
FIG. 3 is a view illustrating a second example of the electrochemical reaction cell in the carbon dioxide electrolytic device illustrated in FIG. 1.

The electrochemical reaction cell 5 has such a structure as illustrated in FIG. 2 or FIG. 3, for example. The electrochemical reaction cell 5 (5A) illustrated in FIG. 2 includes a cathode (reduction electrode) 12, an anode (oxidation electrode) 13, a diaphragm 4 arranged between the cathode 12 and the anode 13, a first flow path 14 that circulates the gas containing $CO_2$ or the first electrolytic solution containing $CO_2$ to be in contact with the cathode 12, a second flow path 15 that circulates the second electrolytic solution containing water to be in contact with the anode 13, a first current collector plate 16 electrically connected to the cathode 12, and a second current collector plate 17 electrically connected to the anode 13. The first flow path 14 functions as the first accommodation part 2, and the second flow path 15 functions as the second accommodation part 3. The first and second current collector plates 16, 17 in the electrochemical reaction cell 5A are electrically connected to a power supply 18. The electrochemical reaction cell may have a state where a plurality of stacked cells are integrated. When a plurality of cells are arranged in an integrated manner, a stack of 10 to about 150 cells is preferable because the reaction amount of carbon dioxide per unit of site area increases, thus making it possible to increase a process amount.

To the first flow path 14, a first supply flow path 19 that supplies the gas containing $CO_2$ or the first electrolytic solution containing $CO_2$ and a first discharge flow path 20 that discharges a produced gas are connected. The first flow path 14 is connected to the $CO_2$ supply part 6. When supplying the gas containing $CO_2$ to the first flow path 14, the $CO_2$ supply part 6 directly supplies the $CO_2$ gas sent from the $CO_2$ separation and recovery device 10 to the first supply flow path 19 or temporarily stores the $CO_2$ gas sent from the $CO_2$ separation and recovery device 10 and then supplies it to the first supply flow path 19. When supplying the first electrolytic solution containing $CO_2$ to the first flow path 14, the $CO_2$ supply part 6 mixes the $CO_2$ gas sent from the $CO_2$ separation and recovery device 10 with the first electrolytic solution and then supplies the mixture to the first supply flow path 19. When supplying the first electrolytic solution containing $CO_2$ to the first flow path 14, a circulation path and a pump that are similar to those on the anode 13 side may be connected to the first flow path 14. In this case, a gas/liquid separation part is connected to the circulation path. The electrochemical reaction cell 5A may include a third flow path (liquid flow path) that circulates the first electrolytic solution (that may or may not contain $CO_2$) to be in contact with the cathode 12 separately from the first flow path (gas flow path) 14.

The second flow path 15 is connected to the electrolytic solution supply part 7. The electrolytic solution supply part 7 includes a circulation path 21 through which the second electrolytic solution is circulated through the second flow path 15 and a pump 22. A gas/liquid separation part 23 is connected to the circulation path 21. In the gas/liquid separation part 23, a liquid component containing the second electrolytic solution and a gas component containing a product are separated, and with the pump 22, the liquid component circulates through the circulation path 21 including the second flow path 15. The gas component separated in the gas/liquid separation part 23 contains oxygen (02) being a product at the anode 13. Further, as will be described in detail later, $CO_2$ supplied to the first flow path 14 moves to the second flow path 15, and thus, the gas component contains also $CO_2$. A gas component discharge portion of the gas/liquid separation part 23 is connected to the $CO_2$ separation part 8.

The electrochemical reaction cell 5 (5B) illustrated in FIG. 3 includes a first accommodation tank 24 that accommodates the first electrolytic solution containing $CO_2$, a second accommodation tank 25 that accommodates the second electrolytic solution containing $H_2O$, a diaphragm 4 arranged between the first accommodation tank 24 and the second accommodation tank 25, a cathode 12 arranged inside the first accommodation tank 24 to be in contact with the first electrolytic solution, and an anode 13 arranged inside the second accommodation tank 25 to be in contact with the second electrolytic solution. The first accommodation tank 24 functions as the first accommodation part 2, and the second accommodation tank 25 functions as the second accommodation part 3. The cathode 12 and the anode 13 in the electrochemical reaction cell 5B are electrically connected to the power supply 18.

To the first accommodation tank 24, the first supply flow path 19 that supplies the gas containing $CO_2$ or the first electrolytic solution containing $CO_2$ and the first discharge flow path 20 that discharges a produced gas are connected. The first supply flow path 19 is connected to the $CO_2$ supply part 6. There is a space for storing the produced gas in an upper portion of the first accommodation tank 24, and the first discharge flow path 20 is connected to this space. When supplying the first electrolytic solution containing $CO_2$ into the first accommodation tank 24, the $CO_2$ supply part 6 mixes the $CO_2$ gas supplied from the $CO_2$ separation and recovery device 10 with the first electrolytic solution and then supplies the mixture to the first accommodation tank 24. The $CO_2$ supply part 6 may supply the $CO_2$ gas supplied from the $CO_2$ separation and recovery device 10 into the first electrolytic solution accommodated in the first accommodation tank 24. A circulation path and a pump that are similar to those of the second accommodation tank 25 may be connected to the first accommodation tank 24.

The flow rate of the $CO_2$ gas from the $CO_2$ separation and recovery device 10 and the flow rate of the $CO_2$ gas from the $CO_2$ separation part 8 may be adjusted by the $CO_2$ supply part 6 to introduce the $CO_2$ gas into the first accommodation part 2 (the first flow path 14 or the first accommodation tank 24). It is also possible to adjust the $CO_2$ gas to be introduced into the first accommodation part 2 (the first flow path 14 or the first accommodation tank 24) by installing a detection part that measures the flow rate of the $CO_2$ gas from the $CO_2$ separation and recovery device 10 and installing a detection part that measures the flow rate of the $CO_2$ gas from the $CO_2$ separation part 8. Further, information from the detection part that measures the flow rate of the $CO_2$ gas from the $CO_2$ separation and recovery device 10 and information from the detection part that measures the flow rate of the $CO_2$ gas from the $CO_2$ separation part 8 may be adjusted by an adjustment part that adjusts the gas flow rate. The adjustment part can adjust the flow rate of $CO_2$ to a more appropriate flow rate of $CO_2$ according to a driving state of the $CO_2$ generation source 9 (generation state of $CO_2$), the flow rate of $CO_2$ from the $CO_2$ separation and recovery device 10, an operation state of the electrochemical reaction cell 5, or the like.

The second accommodation tank 25 is connected to the electrolytic solution supply part 7. The electrolytic solution supply part 7 includes the circulation path 21 through which the second electrolytic solution is circulated through the second accommodation tank 25 and the pump 22. There is a space for storing the produced gas in an upper portion of the second accommodation tank 25, and a second discharge flow path 26 is connected to this space. The gas component discharged from the second discharge flow path 26 contains oxygen (02) being a product at the anode 13 as above, and further contains also $CO_2$ because $CO_2$ supplied to the first accommodation tank 24 moves to the second accommodation tank 25. Thus, the second discharge flow path 26 is connected to the $CO_2$ separation part 8.

The first accommodation tank 24 and the second accommodation tank 25 are separated from each other by the diaphragm 4 capable of allowing ions such as hydrogen ions ($H^+$), hydroxide ions ($OH^-$), hydrogen carbonate ions ($HCO_3^-$), and carbonate ions ($CO_3^{2-}$) to move therethrough, to thereby form a two-chamber structure reaction tank. A two-chamber structure reaction tank (24, 25) may be formed of, for example, quartz white plate glass, polystyrol, polymethacrylate, or the like. A material transmitting light may be used for a part of the two-chamber structure reaction tank (24, 25), and a resin material may be used for the remainder. Examples of the resin material include polyetheretherketone (PEEK), polyamide (PA), polyvinylidene fluoride (PVDF), polyacetal (POM) (copolymer), polyphenyleneether (PPE), acrylonitrile-butadiene-styrene copolymer (ABS), polypropylene (PP), polyethylene (PE), and so on.

The first electrolytic solution to be supplied to the first flow path 14 or the first accommodation tank 24 functions as a cathode solution and contains $CO_2$ as a substance to be reduced. Here, the form of $CO_2$ present in the first electrolytic solution does not have to be in a gaseous form, and may be in the form of dissolved $CO_2$, carbonate ions ($CO_3^{2-}$), hydrogen carbonate ions ($HCO_3^-$), or the like. The first electrolytic solution may contain hydrogen ions and is preferred to be an aqueous solution. The second electrolytic solution to be supplied to the second flow path 15 or the second accommodation tank 25 functions as an anode solution and contains $H_2O$ as a substance to be oxidized. It is possible to change the selectivity of a reduced substance or the proportion of a produced substance by changing the amount of water or electrolytic solution components contained in the first and second electrolytic solutions to change the reactivity. The first and second electrolytic solutions may contain redox couples as needed. Examples of the redox couple include $Fe^{3+}/Fe^{2+}$, $IO^{3-}/I^-$, and so on.

The temperature of the electrochemical reaction cell 5 (5A, 5B) is preferably set to a temperature at which the electrolytic solution does not vaporize in a range of room temperature (for example, 25° C.) to 150° C. It is more preferably the temperature in a range of 60° C. to 150° C., and further preferably the temperature in a range of 80° C. to 150° C. In order to set the temperature to less than room temperature, a cooling device such as a chiller is required, which may cause a decrease in the energy efficiency of an overall system. When the temperature exceeds 150° C., the water in the electrolytic solution turns into vapor and resistance increases, which may cause a decrease in the electrolysis efficiency. The current density of the cathode 12 is not limited in particular, and a higher current density is preferable for increasing the amount of reduction products produced per unit area. The current density is preferably 100 mA/cm$^2$ or more and 1.5 A/cm$^2$ or less, and further preferably 300 mA/cm$^2$ or more 700 mA/cm$^2$ or less. When the current density is less than 100 mA/cm$^2$, the amount of reduction products produced per unit area is small, which requires a large area. When the current density exceeds 1.5 A/cm$^2$, a side reaction of hydrogen generation increases, leading to a decrease in the concentration of reduction products. In the case where Joule heat also increases by increasing the current density, the temperature increases above an appropriate temperature, so that a cooling mechanism may be provided in or near the electrochemical reaction cell 5. The cooling mechanism may be water cooling or air cooling. Even when the temperature of the electrochemical reaction cell 5 is higher than room temperature, the temperature may be employed as it is as long as it is equal to or less than 150° C.

The first electrolytic solution and the second electrolytic solution may be electrolytic solutions containing different substances or may be the same electrolytic solution containing the same substance. In the case where the first electrolytic solution and the second electrolytic solution contain the same substance and the same solvent, the first electrolytic solution and the second electrolytic solution may be regarded as one electrolytic solution. The pH of the second electrolytic solution is preferred to be higher than that of the first electrolytic solution. This makes ions such as hydrogen ions, hydroxide ions, hydrogen carbonate ions, and carbonate ions easy to move through the diaphragm 4. Further, the liquid junction potential due to the difference in pH can effectively promote the oxidation-reduction reaction.

The first electrolytic solution is preferred to be a solution with high absorptance of $CO_2$. The existing form of $CO_2$ in the first electrolytic solution is not always limited to a state of being dissolved therein, and $CO_2$ in an air bubble state may exist to be mixed in the first electrolytic solution. Examples of the electrolytic solution containing $CO_2$ include aqueous solutions containing hydrogencarbonates and carbonates such as lithium hydrogen carbonate ($LiHCO_3$), sodium hydrogen carbonate ($NaHCO_3$), potassium hydrogen carbonate ($KHCO_3$), cesium hydrogen carbonate ($CsHCO_3$), sodium carbonate ($Na_2CO_3$), and potassium carbonate ($K_2CO_3$), phosphoric acid, boric acid, and so on. The electrolytic solution containing $CO_2$ may contain alcohols such as methanol or ethanol, or ketones such as acetone, or may be an alcohol solution or ketone solution. The first electrolytic solution may be an electrolytic solution containing a $CO_2$ absorbent that reduces the reduction potential for $CO_2$, has a high ion conductivity, and absorbs $CO_2$.

As the second electrolytic solution, a solution using water ($H_2O$), which is, for example, an aqueous solution containing an arbitrary electrolyte, can be used. The solution is preferred to be an aqueous solution that promotes the oxidation reaction of water. Examples of the aqueous solution containing the electrolyte include aqueous solutions containing phosphate ions ($PO_4^{2-}$), borate ions ($BO_3^{3-}$), sodium ions ($Na^+$), potassium ions ($K^+$), calcium ions ($Ca^{2+}$), lithium ions ($Li^+$), cesium ions ($Cs^+$), magnesium ions ($Mg^{2+}$), chloride ions ($Cl^-$), hydrogen carbonate ions ($HCO_3^-$), carbonate ions ($CO_3^-$), hydroxide ions ($OH^-$), and so on.

As the above-described electrolytic solutions, for example, ionic liquids in a liquid state in a wide temperature range, which are made of salts of cations such as imidazolium ions or pyridinium ions and anions such as $BF_4^-$ or $PF_6^-$, or aqueous solutions thereof can be used. Further, examples of other electrolytic solutions include amine solutions such as ethanolamine, imidazole, and pyridine, and aqueous solutions thereof. Examples of amine include primary amine, secondary amine, tertiary amine, and so on. The electrolytic solutions may be high in ion conductivity, have properties of absorbing carbon dioxide, and have characteristics of lowering the reduction energy.

Examples of the primary amine include methylamine, ethylamine, propylamine, butylamine, pentylamine, hexylamine, and so on. Hydrocarbons of the amine may be substituted by alcohol, halogen, and the like. Examples of amine whose hydrocarbons are substituted include methanolamine, ethanolamine, chloromethylamine, and so on. Further, an unsaturated bond may exist. These hydrocarbons are also the same in the secondary amine and the tertiary amine.

Examples of the secondary amine include dimethylamine, diethylamine, dipropylamine, dibutylamine, dipentylamine, dihexylamine, dimethanolamine, diethanolamine, dipropanolamine, and so on. The substituted hydrocarbons may be different. This also applies to the tertiary amine. Examples with different hydrocarbons include methylethylamine, methylpropylamine, and so on.

Examples of the tertiary amine include trimethylamine, triethylamine, tripropylamine, tributylamine, trihexylamine, trimethanolamine, triethanolamine, tripropanolamine, tributanolamine, trihexanolamine, methyldiethylamine, methyldipropylamine, and so on.

Examples of the cation of the ionic liquid include 1-ethyl-3-methylimidazolium ion, 1-methyl-3-propylimidazolium ion, 1-butyl-3-methylimidazole ion, 1-methyl-3-pentylimidazolium ion, 1-hexyl-3-methylimidazolium ion, and so on.

A second place of the imidazolium ion may be substituted. Examples of the cation of the imidazolium ion whose second place is substituted include 1-ethyl-2,3-dimethylimidazolium ion, 1,2-dimethyl-3-propylimidazolium ion, 1-butyl-2,3-dimethylimidazolium ion, 1,2-dimethyl-3-pentylimidazolium ion, 1-hexyl-2,3-dimethylimidazolium ion, and so on.

Examples of the pyridinium ion include methylpyridinium, ethylpyridinium, propylpyridinium, butylpyridinium, pentylpyridinium, hexylpyridinium, and so on. In both of the imidazolium ion and the pyridinium ion, an alkyl group may be substituted, or an unsaturated bond may exist.

Examples of the anion include fluoride ion ($F^-$), chloride ion ($Cl^-$), bromide ion ($Br^-$), iodide ion ($I^-$), $BF_4^-$, $PF_6^-$, $CF_3COO^-$, $CF_3SO_3^-$, $NO_3^-$, $SCN^-$, $(CF_3SO_2)_3C^-$, bis(trifluoromethoxysulfonyl)imide, bis(trifluoromethoxysulfonyl)imide, bis(perfluoroethylsulfonyl)imide, and so on. Dipolar ions in which the cations and the anions of the ionic liquid are coupled by hydrocarbons may be used. A buffer solution such as a potassium phosphate solution may be supplied to the first and second accommodation tanks 24, 25.

For the diaphragm 4, a membrane capable of selectively allowing the anion or the cation to pass therethrough, or the like is used. As a result, the electrolytic solutions in contact with the cathode 12 and the anode 13 respectively can be made into electrolytic solutions containing different substances, and further, the reduction reaction and the oxidation reaction can be promoted by the difference in ionic strength, the difference in pH, or the like. The diaphragm 4 can be used to separate the first electrolytic solution from the second electrolytic solution. The diaphragm 4 may have a function of permeating part of ions contained in the electrolytic solutions with the cathode 12 and the anode 13 immersed therein therethrough, namely, a function of blocking one or more kinds of ions contained in the electrolytic solutions. Thereby, the pHs or the like can be made different between the two electrolytic solutions, for example. Further, in terms of the blocking of ions, a diaphragm that does not completely block some ions but is effective enough to limit the amount of movement by ion species may be used.

As the diaphragm 4, there can be used an ion exchange membrane such as, for example, NEOSEPTA (registered trademark) of ASTOM Corporation, Selemion (registered trademark), Aciplex (registered trademark) of ASAHI GLASS CO., LTD., Fumasep (registered trademark), fumapem (registered trademark) of Fumatech GmbH, Nafion (registered trademark) being a fluorocarbon resin made by sulfonating and polymerizing tetrafluoroethylene of E.I. du Pont de Nemours and Company, lewabrane (registered trademark) of LANXESS AG, IONSEP (registered trademark) of IONTECH Inc., Mustang (registered trademark) of PALL Corporation, ralex (registered trademark) of mega Corporation, or Gore-Tex (registered trademark) of Gore-Tex Co., Ltd. Besides, the ion exchange membrane may be formed by using a membrane having hydrocarbon as a basic skeleton or a membrane having an amine group in anion exchange. In the case where the first electrolytic solution and the second electrolytic solution are different in pH, by using a bipolar membrane made by stacking a cation exchange membrane and an anion exchange membrane, the electrolytic solutions can be used while stably keeping the pH thereof.

Besides the ion exchange membrane, as the diaphragm 4, there can be used, for example, porous membranes of a silicone resin, fluorine-based resins such as perfluoroalkoxyalkane (PFA), perfluoroethylene propene copolymer (FEP), polytetrafluoroethylene (PTFE), ethylenetetrafluoroethylene copolymer (ETFE), polyvinylidene fluoride (PVDF), polychlorotrifluoroethylene (PCTFE), and ethylene-chlorotrifluoroethylene copolymer (ECTFE), and ceramics, packing filled with a glass filter, agar, and so on, insulating porous bodies of zeolite, oxide, and so on, and so on. In particular, a hydrophilic porous membrane never causes clogging due to air bubbles and is thus preferably used as the diaphragm 4.

The cathode 12 is an electrode that reduces $CO_2$ supplied as gas or $CO_2$ contained in the first electrolytic solution to produce a carbon compound. In the electrochemical reaction cell 5A, the cathode 12 is arranged to be in contact with the first flow path 14 to be immersed in the first electrolytic solution, and in the electrochemical reaction cell 5B, the cathode 12 is arranged in the first accommodation tank 24 to be immersed in the first electrolytic solution. The cathode 12 contains a reduction catalyst for producing the carbon compound by the reduction reaction of $CO_2$. As the reduction catalyst, a material that reduces activation energy for reducing $CO_2$ is used. In other words, there is used a material that reduces an overvoltage when the carbon compound is produced by the reduction reaction of $CO_2$.

As the cathode 12, for example, a metal material or a carbon material can be used. As the metal material, for example, a metal such as gold, aluminum, copper, silver, platinum, palladium, zinc, mercury, indium, nickel, or titanium, an alloy containing the metal, or the like can be used. As the carbon material, for example, graphene, carbon nanotube (CNT), fullerene, ketjen black, or the like can be used. The reduction catalyst is not limited to the above and, for example, a metal complex such as a Ru complex or a Re complex, or an organic molecule having an imidazole skeleton or a pyridine skeleton may be used as the reduction catalyst. The reduction catalyst may be a mixture of a plurality of materials. The cathode 12 may have, for example, a structure having the reduction catalyst in a thin film shape, a mesh shape, a particle shape, a wire shape, or the like provided on a conductive substrate.

The carbon compound produced by the reduction reaction at the cathode 12 depends on the kind of the reduction catalyst and other factors, and examples of the carbon compound include carbon monoxide (CO), formic acid (HCOOH), methane ($CH_4$), methanol ($CH_3OH$), ethane ($C_2H_6$), ethylene ($C_2H_4$), ethanol ($C_2H_5OH$), formaldehyde (HCHO), ethylene glycol ($C_2H_6O_2$), and so on. Further, at the cathode 12, a side reaction of hydrogen ($H_2$) generation by the reduction reaction of $H_2O$ may occur simultaneously with the reduction reaction of $CO_2$.

The anode 13 is an electrode that oxidizes substances to be oxidized such as substances and ions in the second electrolytic solution. For example, the anode 13 oxidizes water ($H_2O$) to produce oxygen and a hydrogen peroxide solution, or oxidizes chloride ions ($Cl^-$) to produce chlorine. In the electrochemical reaction cell 5A, the anode 13 is arranged to be in contact with the second flow path 15 to be immersed in the second electrolytic solution, and in the electrochemical reaction cell 5B, the anode 13 is arranged in the second accommodation tank 25 to be immersed in the second electrolytic solution. The anode 13 contains an oxidation catalyst for a substance to be oxidized such as $H_2O$. As the oxidation catalyst, a material that reduces activation energy when oxidizing the substance to be oxidized, in other words, a material that reduces a reaction overvoltage is used.

Examples of the oxidation catalyst material include metals such as ruthenium, iridium, platinum, cobalt, nickel, iron, and manganese. Further, a binary metal oxide, a ternary metal oxide, a quaternary metal oxide, or the like can be used. Examples of the binary metal oxide include manganese oxide (Mn—O), iridium oxide (Ir—O), nickel oxide (Ni—O), cobalt oxide (Co—O), iron oxide (Fe—O), tin oxide (Sn—O), indium oxide (In—O), ruthenium oxide (Ru—O), and so on. Examples of the ternary metal oxide include Ni—Fe—O, Ni—Co—O, La—Co—O, Ni—La—O, Sr—Fe—O, and so on. Examples of the quaternary metal oxide include Pb—Ru—Ir—O, La—Sr—Co—O, and so on. The oxidation catalyst is not limited to the above, and a metal hydroxide containing cobalt, nickel, iron, manganese, or the like, or a metal complex such as a Ru complex or a Fe complex can be used as the oxidation catalyst. Further, a plurality of materials may be mixed together to be used.

The anode 13 may be a composite material containing both the oxidation catalyst and a conductive material. Examples of the conductive material include: carbon materials such as carbon black, activated carbon, fullerene, carbon nanotube, graphene, ketjen black, and diamond; transparent conductive oxides such as indium tin oxide (ITO), zinc oxide (ZnO), fluorine-doped tin oxide (FTO), aluminum-doped zinc oxide (AZO), and antimony-doped tin oxide (ATO); metals such as Cu, Al, Ti, Ni, Ag, W, Co, and Au; and alloys each containing at least one of the metals. The anode 13 may have a structure having the oxidation catalyst in a thin film shape, a mesh shape, a particle shape, a wire shape, or the like provided on a conductive substrate, for example. As the conductive substrate, for example, a metal material containing titanium, titanium alloy, or stainless steel is used.

The power supply 18 is to supply power to make the electrochemical reaction cell 5 cause the oxidation-reduction reaction, and is electrically connected to the cathode 12 and the anode 13. By using the electric energy supplied from the power supply 18, the reduction reaction by the cathode 12 and the oxidation reaction by the anode 13 are performed. The power supply 18 and the cathode 12 are connected and the power supply 18 and the anode 13 are connected, for example, by wiring. Between the electrochemical reaction cell 5 and the power supply 18, pieces of electric equipment such as an inverter, a converter, and a battery may be installed as needed. The drive system of the electrochemical reaction cell 5 may be a constant-voltage system or may be a constant-current system.

The power supply 18 may be an ordinary commercial power supply, battery, or the like, or may be a power supply that converts renewable energy to electric energy and supplies it. Examples of such a power supply include a power supply that converts kinetic energy or potential energy such as wind power, water power, geothermal power, or tidal power to electric energy, a power supply such as a solar cell including a photoelectric conversion element that converts light energy to electric energy, a power supply such as a fuel cell or a storage battery that converts chemical energy to electric energy, and a power supply such as a device that converts vibrational energy such as sound to electric energy. The photoelectric conversion element has a function of performing charge separation by emitted light energy of sunlight or the like. Examples of the photoelectric conversion element include a pin-junction solar cell, a pn-junction solar cell, an amorphous silicon solar cell, a multijunction solar cell, a single crystal silicon solar cell, a polycrystalline silicon solar cell, a dye-sensitized solar cell, an organic thin-film solar cell, and so on. Further, the photoelectric conversion element may be stacked on at least one of the cathode 12 and the anode 13 inside the reaction tank.

Next, the operation of the carbon dioxide electrolytic device 1 will be explained. Here, there will be described the case of reducing $CO_2$ to mainly produce carbon monoxide (CO) and oxidizing $H_2O$ to produce oxygen. When a voltage that is equal to or more than a bath voltage is applied between the cathode 12 and the anode 13, the oxidation reaction of $H_2O$ occurs near the anode 13 in contact with the second electrolytic solution. As expressed in the following expression (1), the oxidation reaction of $H_2O$ contained in the second electrolytic solution occurs, electrons are lost, and oxygen ($O_2$) and hydrogen ions ($H^+$) are produced. A part of the produced hydrogen ions ($H^+$) move through the diaphragm 4 into the first electrolytic solution in the first accommodation part 2.

$$2H_2O \rightarrow 4H^+ + O_2 + 4e^- \quad (1)$$

When the hydrogen ions ($H^+$) produced on the anode 13 side reach the vicinity of the cathode 12 and electrons ($e^-$) are supplied to the cathode 12 from the power supply 18, the reduction reaction of $CO_2$ occurs. As expressed in the following expression (2), $CO_2$ contained in the electrolytic solution is reduced by the hydrogen ions ($H^+$) that have moved to the vicinity of the cathode 12 and the electrons ($e^-$) supplied from the power supply 18 to produce carbon monoxide (CO).

$$2CO_2 + 4H^+ + 4e^- \rightarrow 2CO + 2H_2O \quad (2)$$

The reduction reaction of $CO_2$ is not limited to the production reaction of CO, and may be a production reaction of ethanol ($C_2H_5OH$), ethylene ($C_2H_4$), ethane ($C_2H_6$), methane ($CH_4$), methanol ($CH_3OH$), acetic acid ($CH_3COOH$), propanol ($C_3H_7OH$), or the like.

As expressed in the above expression (1), the gas component discharged from the second flow path 15 or the second accommodation tank 25 on the anode 13 side has been considered to be an oxygen ($O_2$) gas mainly. The discharged gas on the anode 13 side, which has been considered to be an $O_2$ gas, has been released into the atmosphere unless it is reused. In the above-described reactions at the cathode 12 and the anode 13, $CO_2$ supplied to the cathode 12 side is subjected to a reduction reaction at the cathode 12, but a part of $CO_2$ flows into the anode 13 side as $CO_2$ or as carbonate ions ($CO_3^{2-}$), hydrogen carbonate ions ($HCO_3^-$), or the like. The carbonate ions ($CO_3^{2-}$) or the hydrogen carbonate ions ($HCO_3^-$) that have moved to the anode 13 side come to be present as $CO_2$ by a chemical equilibrium reaction when the pH of the anode solution (the second electrolytic solution) becomes, for example, 6 or less, and a part of $CO_2$ is dissolved in the anode solution. Such a $CO_2$ gas, which is not fully dissolved in the anode solution, will be contained with the $O_2$ gas in the gas discharged from the anode 13 side. Under general operating conditions of the electrochemical reaction cell 5, the abundance ratio of $CO_2$ to $O_2$ in the discharged gas from the anode 13 side increases up to, for example, 2:1 in some cases. The ratio (volume ratio) of $CO_2$ to $O2$ varies depending on the operating condition, and is considered to be about $CO_2:O_2$=4:6 to 8:2.

In the case where such a gas containing $CO_2$ and $O_2$ as above is released into the atmosphere as the discharged gas on the anode 13 side, the burden on the environment increases, and at the same time, the use efficiency of $CO_2$ and the use efficiency and the utility value of the reduction products of $CO_2$ are reduced. Thus, in the carbon dioxide electrolytic device 1 in the embodiment, the $CO_2$ separation part 8 that separates and recovers $CO_2$ in the discharged gas is connected to the discharge portion that discharges the gas component (gas component containing $O_2$ and $CO_2$) from the second accommodation part in the electrochemical reaction cell 5. Specifically, in the case of the electrochemical reaction cell 5A, the $CO_2$ separation part 8 is connected to a gas component discharge portion of the gas/liquid separation part 23 connected to the circulation path 21 through which the second electrolytic solution is circulated. In the case of the electrochemical reaction cell 5B, the $CO_2$ separation part 8 is connected to the second discharge flow path 26 connected to the storage space for the produced gas provided in the upper portion of the second accommodation tank 25.

Figure 4:
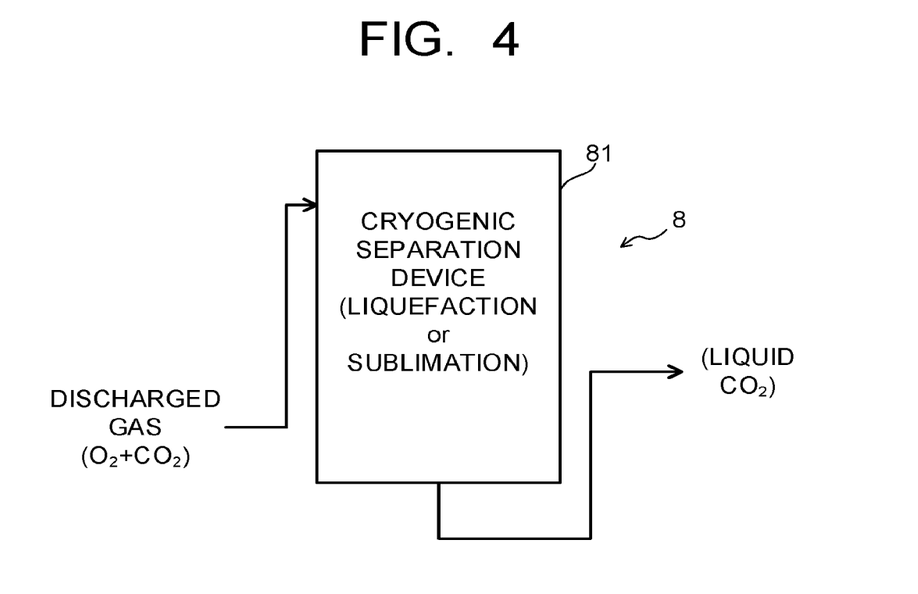
FIG. 4 is a view illustrating a cryogenic separation device as a carbon dioxide separation part in the carbon dioxide electrolytic device illustrated in FIG. 1.

As the $CO_2$ separation part 8, there is applied a cryogenic cooling method that performs separation by a temperature difference (difference in boiling point or melting point) between $CO_2$ and another gas component containing $O_2$. As illustrated in FIG. 4, the $CO_2$ separation part 8 includes a cryogenic separation device 81 that separates $CO_2$ from the discharged gas on the anode 13 side. The cryogenic separation device 81 can include a cryogenerator (cooling device), a compressor, a heat exchanger, a rectifying device, and so on, which are not illustrated. For example, $CO_2$ becomes liquid $CO_2$ when cooled to a low temperature state (−56.7° C. or less) under high pressure (for example, 0.52 MPa or more). At this time, $O_2$ remains in a gaseous state even under high pressure and does not become a liquid state because its boiling point under atmospheric pressure (0.1 MPa) is −183° C. Therefore, in the above-described high-pressure and low-temperature state, only $CO_2$ can be liquefied and separated as liquid $CO_2$. Further, $CO_2$ sublimates at −78.5° C. under normal pressure (for example, under atmospheric pressure (0.1 MPa)) to become a solid (dry ice). $O_2$ remains in a gaseous state even under such a situation, and thus, $CO_2$ can be separated as a solid (dry ice).

As described above, the cryogenic cooling method is a method of separating respective gases by using the difference in temperature at which a gas becomes a liquid or solid. The cryogenic separation device 81 as the $CO_2$ separation part 8 may include a compressor that compresses a gas. At this time, the gas discharged from the gas/liquid separation part 23 illustrated in FIG. 2 or from the second discharge flow path 26 connected to the upper space in the second accommodation tank 25 illustrated in FIG. 3 sometimes increases up to, for example, 2:1 as the abundance ratio of $CO_2$ to $O_2$ as described above, and it is generally considered that the volume ratio of them is about $CO_2:O_2$=4:6 to 8:2 although it varies depending on the operating conditions. When the concentration of $CO_2$ in the discharged gas component is low in separating $CO_2$ from the gas containing gas components other than $CO_2$ in the discharged gas, the other gases have to be compressed and cooled, which requires more motive power necessary for the separation, namely, more energy for cooling.

The discharged gas from the second accommodation part (anode part) 3 in the carbon dioxide electrolytic device 1 in the embodiment is characterized by being higher in the concentration of $CO_2$ than the concentration of $CO_2$ in the air or the exhaust gas from the $CO_2$ generation source 9 such as a thermal power plant or garbage incinerator. Therefore, when the cryogenic separation device 81 is attached to the carbon dioxide electrolytic device 1 as the $CO_2$ separation part 8, the $CO_2$ separation part (device) 8 can be reduced in size and the energy consumption can be kept low. On the other hand, for example, a $CO_2$ separation device using an amine absorbent is not expected to be as small as the cryogenic separation device and to reduce the amount of energy input because of the relationship between the amount of a $CO_2$ absorbing liquid and $CO_2$ absorption capacity although the size of the plant and the amount of energy input depend on the amount of gas. As described above, the cryogenic separation device 81 can achieve a higher concentration of $CO_2$ than other $CO_2$ separation devices, and in such a case, the size of the plant and the amount of energy input can be reduced. The cryogenic separation device 81 can separate $CO_2$ with a small amount of energy input. The separated $CO_2$ can be used as a gas and can further be used for cooling the electrochemical reaction cell 5 or the like as liquid $CO_2$ in a cooled state and solid $CO_2$ (dry ice), or the like, as will be described later.

Figure 5:
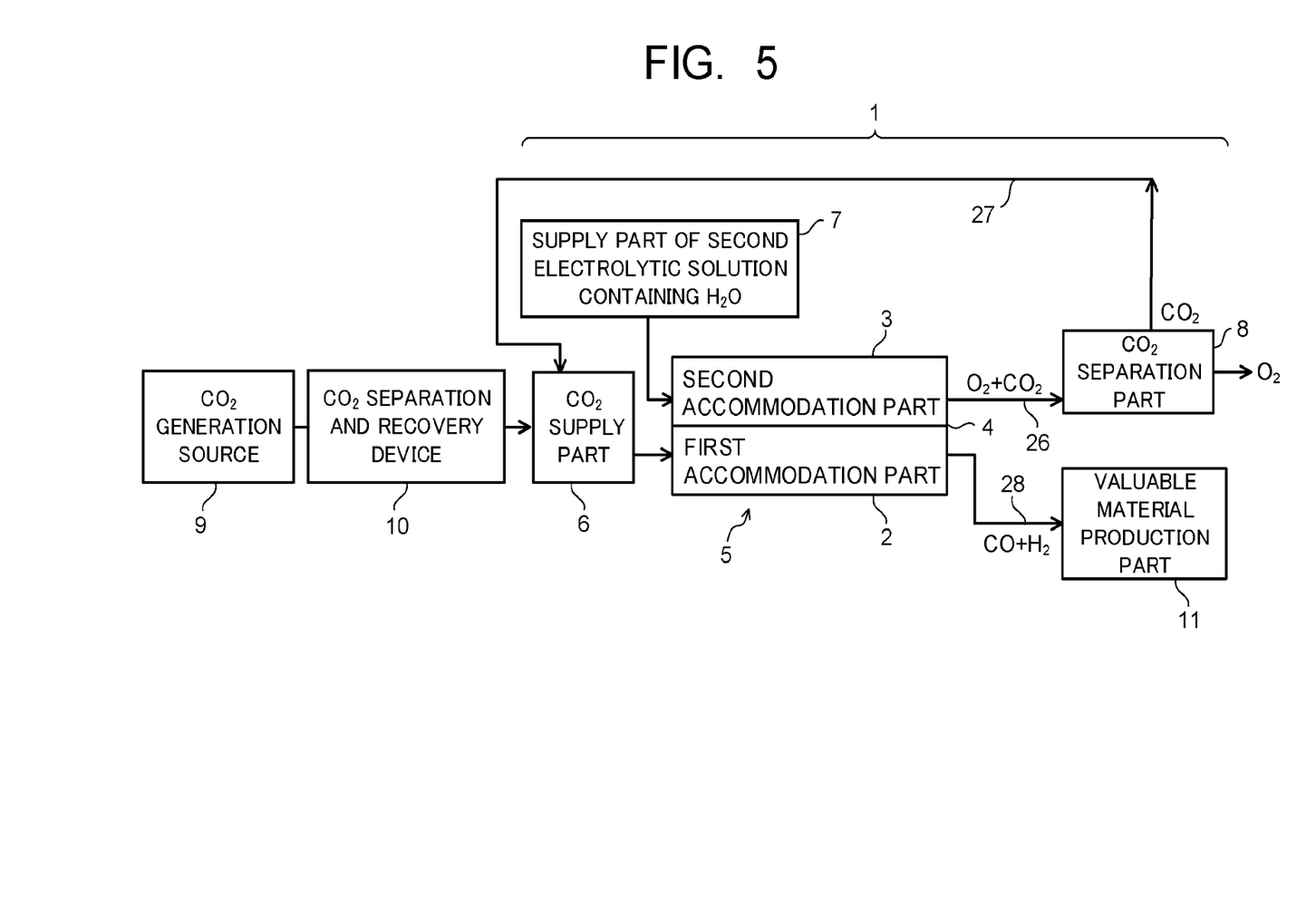
FIG. 5 is a view illustrating a first modified example of the carbon dioxide electrolytic device in the embodiment.

The $CO_2$ gas separated in the $CO_2$ separation part 8 may be reused in a device or the like different from the carbon dioxide electrolytic device 1, but is preferably reused in the first accommodation part 2 of the carbon dioxide electrolytic device 1. Specifically, as illustrated in FIG. 5, a $CO_2$ resending flow path 27 connected to a $CO_2$ discharge port of the $CO_2$ separation part 8 can be connected to the $CO_2$ supply part 6. Thereby, $CO_2$ discharged from the anode 13 side can be reused in the carbon dioxide electrolytic device 1, resulting in that it is possible to increase the use efficiency of $CO_2$ and the use efficiency and the utility value of the reduction products of $CO_2$. The $CO_2$ resending flow path 27 may be directly connected to the first accommodation part 2 in the electrochemical reaction cell 5, but is preferably connected to the first supply part 6 that supplies the $CO_2$ gas to the first accommodation part 2. The first supply part 6 can include a supply device or the like that supplies $CO_2$ from a tank or a storage tank that temporarily stores $CO_2$ to the first accommodation part 2 while adjusting the amount of supplying $CO_2$ so as to adjust the amount of $CO_2$ input to the electrochemical reaction cell 5, thereby stabilizing the reduction state of $CO_2$ in the electrochemical reaction cell 5. Further, the $CO_2$ resending flow path 27 may be configured to resend $CO_2$ separated in the $CO_2$ separation part 8 to the $CO_2$ generation source 9 and the $CO_2$ separation and recovery device 10.

There has been explained the case where the $CO_2$ separation part (a first $CO_2$ separation part) 8 is connected to the discharge portion of the second accommodation part 3 that accommodates the second electrolytic solution containing water in the electrochemical reaction cell 5, but a second $CO_2$ separation part (not illustrated) may be connected also to the discharge portion of the first accommodation part 2 that accommodates $CO_2$. The configuration of the second $CO_2$ separation part may be the same as the first $CO_2$ separation part, and the second $CO_2$ separation part may be a $CO_2$ separation device other than the cryogenic separation device. Further, to the discharge portion of the first accommodation part 2, a hydrogen separation part (not illustrated) may further be connected as will be described later.

The cold heat generated when using the above-described cryogenic separation device 81 can be used, for example, for cooling at least a part of the electrochemical reaction cell 5. When cooling is required also in the valuable material production part 11, the cold heat generated in the cryogenic separation device 81 can be used. The cold heat generated in the cryogenic separation device 81, which is, for example, liquid $CO_2$ in a cooled state and solid $CO_2$ (dry ice), a cooled $CO_2$ gas to be generated from them, a residual gas (separation gas) from which $CO_2$ has been separated, and so on, may be used to directly cool at least a part of the electrochemical reaction cell 5, or these cooling media may be used to cool the electrochemical reaction cell 5, or the like via a heat conduction member. Here, the cold heat generated from the cryogenic separation device 81 may be used to cool, in the case of the valuable material production part 11 having a portion that needs to be cooled, such a portion, as well as cooling the electrochemical reaction cell 5.

Figure 6:
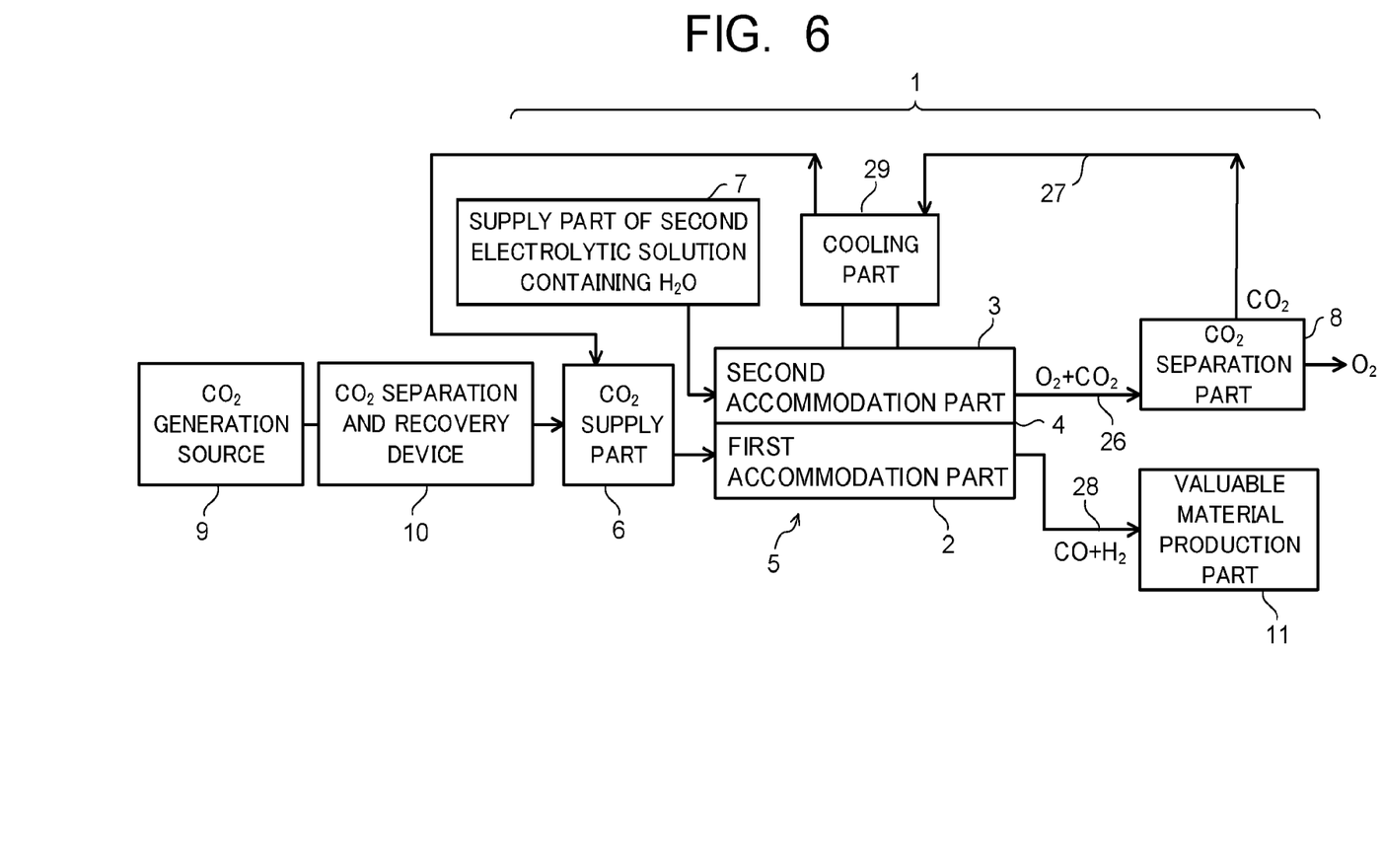
FIG. 6 is a view illustrating a second modified example of the carbon dioxide electrolytic device in the embodiment.

As illustrated in FIG. 6, for example, when a cooling part 29 using a medium such as a cooling water is used when cooling the electrochemical reaction cell 5, for example, a gas, liquid, or solid mainly containing $CO_2$ in a cooled state separated in the cryogenic separation device 81, or a residual gas (separation gas) from which $CO_2$ has been separated, or the like may be used as a cooling medium in a heat exchanger for cooling the cooling water in the cooling part 29. Further, a metallic heat-transferable joint part in which a gas or liquid is injected into a heat sink or the like may be cooled by the above-described cooling medium, and the electrochemical reaction cell 5 may be cooled by the cooled joint part. These make it possible to further improve the energy efficiency of the carbon dioxide electrolytic device 1. FIG. 6 illustrates a state where the cooling part 29 is connected to the second accommodation part 3 of the electrochemical reaction cell 5, which is illustrated for convenience, and the cooling part 29 is used to cool the first accommodation part 2, and further to cool the entire cell.

It is also possible to arrange a detection part that detects the flow rate of gas and the composition of gas to be input to the $CO_2$ separation part 8 and a detection part that detects the flow rate of gas, the concentration of $CO_2$, and the composition of gas to be discharged from the $CO_2$ separation part 8. The cooling capacity of the $CO_2$ separation part 8 can be adjusted based on data from the detection part that measures the flow rate of the $CO_2$ gas from the $CO_2$ separation and recovery device 10, the detection part that measures the flow rate of the $CO_2$ gas from the $CO_2$ separation part 8, and a current and voltage detection part of the electrochemical reaction cell 5. Further, a temperature detection function can also be added to the detection part that detects the flow rate of gas and the composition of gas to be input to the $CO_2$ separation part 8 and the detection part that detects the flow rate of gas, the concentration of $CO_2$, and the composition of gas to be discharged from the $CO_2$ separation part 8. With this temperature information, it becomes possible to adjust the cooling capacity of the $CO_2$ separation part 8. The operation of the cooling part 29 can also be controlled based on information of each of the detection parts. Further, each of the adjustment parts can adjust the cooling capacity of the $CO_2$ separation part 8 to an appropriate cooling capacity according to a driving state of the $CO_2$ generation source 9 (generation state of $CO_2$), an operation state of the electrochemical reaction cell 5, or the like. The heating value of the electrochemical reaction cell 5 varies depending on the operating condition of the electrochemical reaction cell 5, and thus, an adjustment device that adjusts an introduction amount may be installed in a pipe to be introduced into the cooling part.

The valuable material production part 11 is a chemical synthesis device that chemically synthesizes a valuable material by using CO and the like discharged from the first accommodation part 2 as a raw material. The produced gas discharged from the first accommodation part 2 in the electrochemical reaction cell 5 may be directly used or consumed, but the chemical synthesis device is provided at a subsequent stage of the electrochemical reaction cell 5, thereby making it possible to produce a valuable material with a high added value. The valuable material production part 11 is connected to a first discharge flow path 28 through which the produced gas is discharged from the first accommodation part 2. To the first discharge flow path 28, there may be connected a product separator or the like that separates redundant $CO_2$ from the discharged gas or separates CO or the like being a product by removing moisture in the discharged gas. To the valuable material production part 11, the produced gas such as CO is supplied from the first accommodation part 2 through the first discharge flow path 28. For example, when the CO gas is produced in the electrochemical reaction cell 5 by the above-described (2) expression, by using, as a raw material, a mixed gas obtained by mixing the produced CO gas and the $H_2$ gas as a by-product of the reduction reaction, methanol can be produced through methanol synthesis, or jet fuel, light oil, or the like can be produced through Fischer-Tropsch synthesis.

The valuable material production part 11 is not limited to the above-described chemical synthesis device, and is not limited in particular as long as it is capable of causing a reaction to synthesize another substance from the reduction product produced in the first accommodation part 2. The reaction of the reduction product by the valuable material production part 11 includes a chemical reaction, an electrochemical reaction, a biological conversion reaction using a product such as algae, enzyme, yeast, or bacteria, and so on. In the case where the chemical reaction, the electrochemical reaction, and the biological conversion reaction by bacteria or the like are higher in temperature than room temperature, at least one parameter of reaction efficiency and a reaction rate sometimes improves. In the case where the reduction product introduced into the valuable material production part 11 is set to a temperature of 60° C. or more and 150° C. or less, it is possible to improve the energy conversion efficiency of the carbon dioxide electrolytic device 1. The reaction of the biological conversion reaction by bacteria or the like progresses most efficiently at the temperature around 80° C., and thus when the reduction product is introduced into the valuable material production part 11 at a temperature of 60° C. or more and 100° C. or less, the efficiency further improves. The valuable material production part 11 may be heated or pressurized by applying energy thereto from outside, in order to improve the reaction efficiency.

The reduction product may contain $H_2$ obtained by electrolysis of $CO_2$, CO, and $H_2O$. The concentration of $H_2$ can be arbitrarily adjusted depending on uses. In the case where $H_2$ is used in the valuable material production part 11, $H_2$ may be used from which $CO_2$ is separated in order to use $H_2$ as a mixture of CO and $H_2$. In the case where $H_2$ is not used, CO is only separated. In the case of producing methanol or the like, it is possible to use $H_2$, which is a side reactant in the first accommodation part 2 in the electrochemical reaction cell 5, as a valuable material by adjusting the number of moles of $H_2$ to about twice the number of moles of CO. In the meantime, in the first accommodation part 2, the side reaction of $H_2$ is suppressed by the reaction condition, thereby making it also possible to adjust the concentration of $H_2$ in the reduction product to a range of 0.1% or more and 5% or less in volume percent. This makes it possible to use the valuable material production part 11 as a CO production device that provides high-concentration CO.

Figure 7:
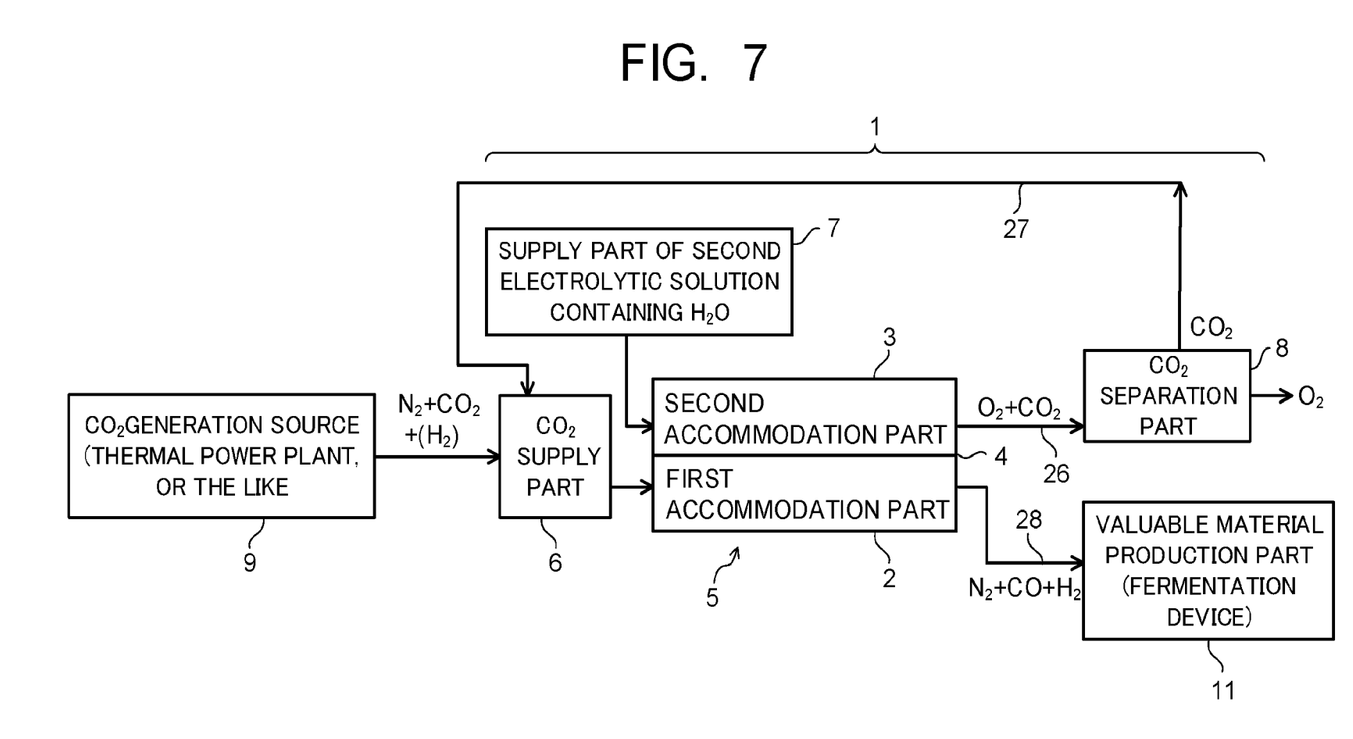
FIG. 7 is a view illustrating a third modified example of the carbon dioxide electrolytic device in the embodiment.

The valuable material production part 11 can further be used in various forms. Depending on the kind of a thermal power plant, a blast furnace, or the like as the $CO_2$ generation source 9, for example, each component in the discharged gas is sometimes contained in a specific ratio, as illustrated in FIG. 7, for example. The gas discharged from, for example, a thermal power plant, a blast furnace, or the like contains $N_2$ and $CO_2$ mainly and further contains $H_2$ as a secondary component, and the content ratio of $CO_2$ is about 15% in some cases. When such a discharged gas is directly sent to the first accommodation part 2 to cause a reduction reaction of $CO_2$ in the first accommodation part 2, a mixed gas containing produced CO, $H_2$ as a by-product, redundant $CO_2$, and $N_2$ is discharged from the first accommodation part 2. Such a mixed gas containing CO, $CO_2$, $H_2$, and $N_2$ is sometimes preferable as a raw material gas of a fermentation reaction device (gas fermentation and anaerobic respiration) as the valuable material production part 11, namely, a biosynthesis device that produces fuel or chemical substances such as methanol, ethanol, and butanol by anaerobic microorganisms. The mixed gas discharged from the above-described first accommodation part 2 is supplied, as the raw material gas, to such a biosynthesis device, thereby making it possible to increase the use efficiency and the utility value of the reduction product of $CO_2$. Further, the $CO_2$ separation and recovery device 10 as a preceding stage of the carbon dioxide electrolytic device 1 is no longer required, so that it is possible to provide a more inexpensive and higher efficient system.

Note that the above-described configurations in the embodiments are applicable in combination, and parts thereof are also replaceable. While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A carbon dioxide electrolytic device, comprising:
an electrochemical reaction cell including: a first accommodation part configured to accommodate gas containing carbon dioxide or a first electrolytic solution containing carbon dioxide; a second accommodation part configured to accommodate a second electrolytic solution containing water; a diaphragm provided between the first accommodation part and the second accommodation part; a cathode arranged to be in contact with the gas or the first electrolytic solution and configured to reduce carbon dioxide to produce a carbon compound;
and an anode arranged to be in contact with the second electrolytic solution and configured to oxidize water to produce oxygen;
a first supply part to supply the gas or the first electrolytic solution to the first accommodation part;
a second supply part to supply the second electrolytic solution to the second accommodation part;
a first carbon dioxide separation part that is connected to a discharge portion to discharge a discharge containing oxygen and carbon dioxide from the second accommodation part and includes a cryogenic separation device to separate the carbon dioxide from a gas component in the discharge; and
a cooling part configured to cool a cooling water for cooling at least a part of the electrochemical reaction cell by using, as a cooling medium, a gas, liquid, or solid mainly containing the carbon dioxide separated in the cryogenic separation device, or a residual gas from which the carbon dioxide has been separated in the cryogenic separation device.

2. The device according to claim 1, wherein
the first carbon dioxide separation part includes a carbon dioxide resending flow path that resends the separated carbon dioxide to the first accommodation part, the first supply part, or a carbon dioxide generation source that supplies the carbon dioxide to the first supply part.

3. The device according to claim 1, further comprising:
a second carbon dioxide separation part that is connected to a discharge portion to discharge a discharge from the first accommodation part and configured to separate carbon dioxide from a gas component in the discharge.

4. The device according to claim 1, further comprising:
a valuable material production part that is connected to a discharge portion to discharge a discharge containing the carbon compound from the first accommodation part and configured to synthesize a valuable material by using at least a part of the discharge gas a raw material.

5. The device according to claim 4, wherein
the valuable material production part includes a fermentation reaction device configured to synthesize a fuel or a chemical substance as the valuable material.

6. The device according to claim 4, further comprising:
a second cooling part configured to cool a part of the valuable material production part by using the cooling medium.

* * * * *